United States Patent [19]

Williams

[11] 4,252,076
[45] Feb. 24, 1981

[54] AUTOMATIC SIGNALING DEVICE

[76] Inventor: Douglas J. Williams, 25440 Cariz Dr., Valencia, Calif. 91355

[21] Appl. No.: 971,491

[22] Filed: Dec. 20, 1978

Related U.S. Application Data

[63] Continuation of Ser. No. 877,298, Feb. 13, 1978, abandoned, which is a continuation of Ser. No. 747,367, Dec. 3, 1976, abandoned.

[51] Int. Cl.$^2$ .............................................. B06B 1/20
[52] U.S. Cl. .............................. 116/137 R; 116/266; 116/112
[58] Field of Search ............... 116/137 R, 137 A, 138, 116/65, 112, 70, DIG. 19; 46/174; 340/406; 84/335

[56] References Cited

U.S. PATENT DOCUMENTS 1,530,899  3/1925  Limon ............................ 116/137 R
1,540,023  6/1925  Kollinek ......................... 116/137 R

FOREIGN PATENT DOCUMENTS 348883  2/1922  Fed. Rep. of Germany ...... 116/137 R
894532  4/1962  United Kingdom ................ 116/137 A Primary Examiner—S. Clement Swisher
Assistant Examiner—Denis E. Corr
Attorney, Agent, or Firm—William W. Glenny

[57] ABSTRACT

An automatic signaling device responsive to small pressure variation, said pressure variations being created by a restriction of fluid flow within a flow system. The pressure variation causes fluid to flow through a resonant; loading chamber, activating a longitudinal wave resonator. The generation of longitudinal waves is apparent by the production of an audible signal. The device is mounted to the flow system using attaching means designed as part of or appurtenant to the device. In some embodiments the dimensions of the respective components of the device are adjustable.

1 Claim, 7 Drawing Figures

AUTOMATIC SIGNALING DEVICE

This is a continuation of application Ser. No. 877,298, filed Feb. 13, 1978, which was a continuation of application Ser. No. 747,367, filed Dec. 3, 1976, both applications now abandoned.

BACKGROUND OF THE INVENTION

The field of this invention relates to signaling devices, and more particularly to a signal device which is automatically activated by small pressure variations within the system in which the device is mounted.

The ultimate performance goal for any signaling device is to render an attention demanding signal consistently and without fall whenever prescribed by chosen conditions. In the past, in order to produce a reactive signal sensitive to pressure variations, a vortex resonator has been used. Such devices require high velocity fluid flow to produce signals and are not easily adaptable to the production of signals automatically. Further, the point at which the signal is generated in such devices is subject to wide variation due to overtone effects. The alternative to vortex resonators has been complicated mechanical devices involving vibrating reeds, balls, and the like, and involved the mechanical motion of one or more parts. Often these devices are subject to mechanical failure, are costly to make, and require substantial pressure variation for activation. On the other hand, non-mechanical devices designed to be reactive to small variations in pressure were incapable of producing a signal of sufficient energy to be of value in many applications.

As a result of these considerations, devices for automatic signaling of small pressure variations in the past have been at least partially inadequate to accomplish their designed purpose.

Therefore, it would be desirable to design an automatic signaling device which is sensitive to small pressure variation, and produces an effective signal without failure-prone mechanical mechanisms.

SUMMARY OF THE INVENTION

The signaling device of this invention is designed primarily as an automatic device producing an audible signal when small variations in fluid pressures occur. This is accomplished using a combination of a loading resonator and a longitudinal resonator. The loading resonator, being a chamber having an angular concentric restriction, is placed in substantially direct alignment with the longitudinal resonator, said longitudinal resonator being a chamber of defined dimension and shape. The volume of the loading chamber, size of the restriction, angle of such restrictive structure, and configuration and size of the longitudinal resonating chamber are intended to be variable according to the individual application, and such variability is intended to be within the scope of this invention. These physical configurations are also intended to be variable within a given design to allow adjustment of that design to various desired points of reactivity or flow conditions. Such variability of each individual unit is intended to be within the scope of this invention.

The advantages of the structure and design of this invention are many, some of which are as follows: it can be manufactured at a low cost, the signal is produced automatically and stops automatically upon the occurance of pre-determined conditions, the device is reactive at extremely small amounts of variation in pressure, as well as gross variations in pressure, there are no moving mechanical mechanisms to fail, the device has an extremely long lifespan under normal conditions, the device is readily positioned in a wide variety of different flow systems and environments, the device is adaptable to any flow condition or desired point of signal initiation. Considerable flexibility is designed into the invention to allow various adjustments and adaptations to conditions which dictate such factors as point of signal, nature of the signal, methods of fastening to the system, etc.

DETAILED DESCRIPTION OF THE SHOWN EMBODIMENT

Figure 1:
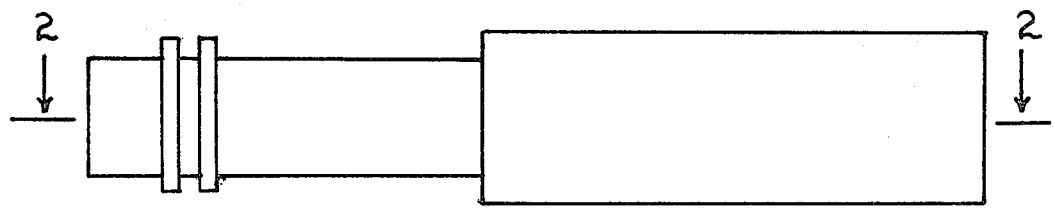
FIG. 1 is a front view of the signaling device of this invention.
Figure 2:
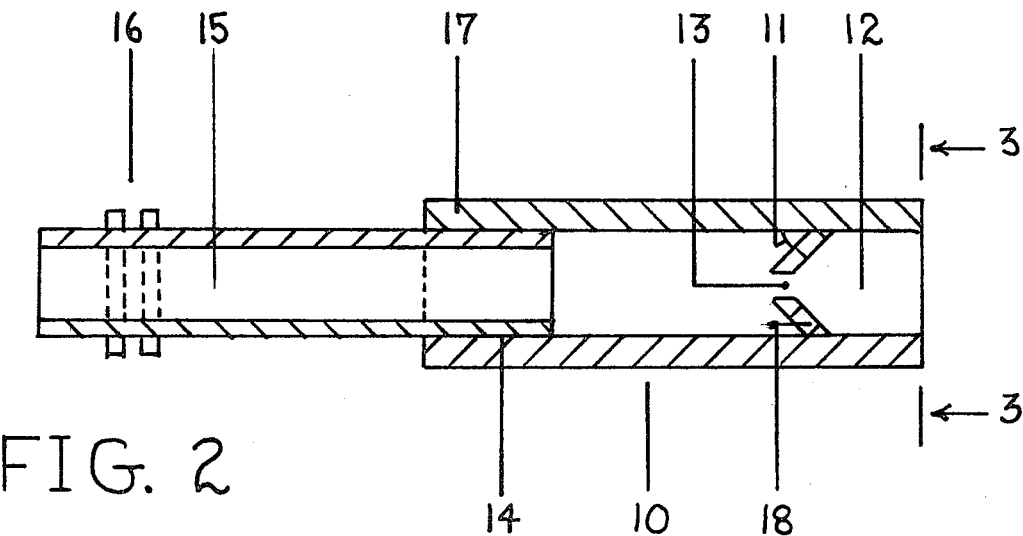
FIG. 2 is a cross-sectional view taken along the plane 2—2 of FIG. 1.
Figure 3:
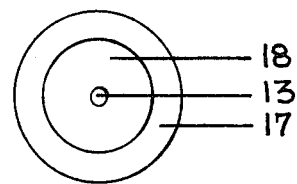
FIG. 3 is an end view of the signaling device of this invention taken along the plane 3—3 of FIG. 2.

Refering particularly to the drawing, there is shown in FIG. 1 the signaling device 10 of this invention. The signaling device is shown to be cylindrical in shape. However, it is considered to be within the scope of this invention that the signaling device could be in any desired shape, such as cubular, spherical, pyramidal, folded columnar, or other desired configuration. Refering particularly to FIG. 2, the exterior structures 17 are shown to be constructed of a rigid metal material. However, it is considered to be within the scope of this invention that the exterior structure 17 could be of any other desired material, such as rigid or semi-rigid plastic, rubber, or other desired material, or any combination of these. The signal device 10 is shown to have two interconnected exterior structures 17. However, it is considered to be within the scope of this invention that in certain configurations the signal device 10 could have only one contiguous exterior structure 17 or more than two exterior structures 17 as may be desired.

The exterior structure 17 encloses a resonant loading chamber 12 and a longitudinal resonator 15 said resonant chambers being separated by a restrictive structure 18. This restrictive structure 18 is formed at an angle 11 with the plane of the exterior structures 17, and has an opening 13 through which fluid passes. The resonant chamber 12 is shown to be significantly smaller than the longitudinal resonator 15. However, it is considered to be within the scope of this invention that the relative sizes may be equal, the resonant loading chamber 12 be slightly larger than the longitudinal resonator 15, the resonant loading chamber 12 be siginificantly larger than the longitudinal resonator 15, or the inverse of these relationships as desired.

Further, the restrictive structure 18 is shown to form an acute angle 11 with the exterior structure 17, the preferred angle being 15°. In some configurations, the angle may be greater or less than 90°, or equal to 90°, or variable in nature. Such configurations are considered to be within the scope of this invention. The opening 13 in the restrictive structure 18 is shown to be significantly smaller than the width of the resonant loading chamber 12 and the longitudinal resonator 15. It is considered to be within the scope of this invention that the opening 13 could be smaller or larger in size relative to these structures. Further, it is considered to be within the scope of this invention that the cross-sectional configuration of the opening 13 could be of any desired shape, such as round, square, triangular, etc.. The shape of the restrictive structure 18 is shown to cross-sectionally be that of a parallelogram. It is intended to be within the scope of this invention that this be any desired configuration, such as square, elliptical, rectangular, rhomboid, or curvilinear.

The exterior structure 17 is shown to join at a common point 14, such point allowing relative sliding motion between the two structural parts 17, thus adjusting the length of the longitudinal resonator 15. It is intended to be within the scope of this invention that this joint could be created by any desired mechanism, such as threads, notches, slip surfaces, or compression surfaces. Further, it is also considered to be within the scope of this invention that there be more or less than one such union 14.

Figure 6:
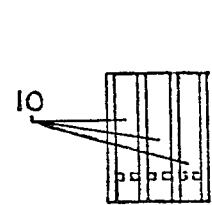
FIG. 6 is a cross-sectional view of the signaling device of this invention constructed of a plurality of individual signaling devices.

The signal device 10 is shown to attach to the flow system by means of a first and second attaching structure 16, placed in such a way as to form a gap between them, the function of which is to sandwich some portion of the flow system supportive structure, said portion occupying the gap therebetween formed. It is considered to be within the scope of this invention that such attaching means could be of any desired nature, such as threads, ribs, spirals, fewer or additional washers, springs, pins, tape, glue or other means as desired. FIG. 6 illustrates one type of possible threaded mechanism 19 for such attachment.

It is further considered to be within the scope of this invention that the attaching medium could be self-contained rather than a portion of the flow system supportive structure. Such self-contained attaching media could take the form of a clip or clips, brackets, stands, and the like, or simply an orifice through which the signaling device 10 is inserted.

It is also considered to be within the scope of this invention that more than one signaling device 10 may be used simultaneously with another device 10 of the same or different dimensions, thus producing more audible signals through volume increase, beat frequency generation, or overtone interference. Such a plurality may be separate structures, or some or all may be combined into one structure, as desired. FIG. 6 shows such a combined structure, having a plurality of signaling devices 10 combined. Such a device, combining more than one signaling device 10, could be designed to produce a signal at more than one desired set of pre-determined conditions, thus creating a multiple warning point signaling device. Such a device is intended to be within the scope of this invention.

Figure 4:
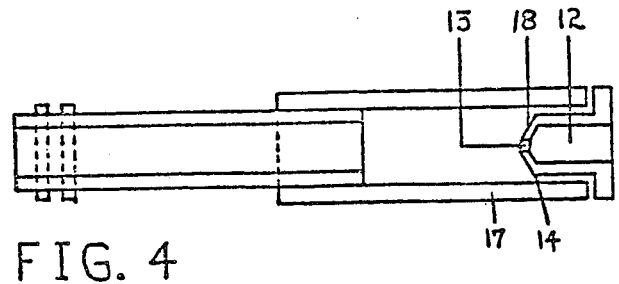
FIG. 4 is a cross-sectional view of the device of this invention illustrating a replacable resonant loading chamber.
Figure 5:
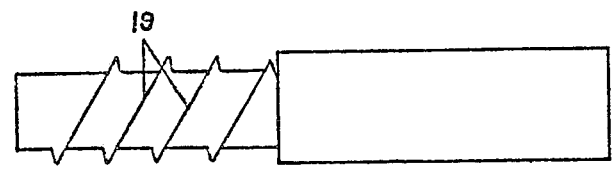
FIG. 5 is a front view of the signaling device of this invention illustrating the attaching means to be exterior threads.

Refering to FIG. 4, the resonant loading chamber 12 is shown to be constructed in such a manner as to be readily replacable with other such units of the same or different dimensions or configurations. The point of union 14 between the resonant loading chamber 12 and the exterior structure 17 is shown to be a slip type union. It is considered to be within the scope of this invention that this union could be of any desired type, such as threads, slip, notched, ribbed, or any other desired.

Figure 7:
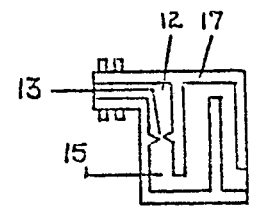
FIG. 7 is a cross-sectional view of the signaling device of this invention illustrating a folded columnar configuration.

Refering to FIG. 7, the signaling device 10 is shown to be of a folded columnar configuration, having a maze-like resonant loading chamber 12, longitudinal resonator 15, and exterior structure 17. It is intended that any desired configuration of any of these structures be within the scope of this invention.

What is claimed is:

1. A signaling device for producing an audible sound in response to gas flow therethrough comprising:
   a longitudinally extending resonator having an inner cylindrical wall for receiving and transmitting gas flow therethrough;
   and restrictor means having an aperture formed therein for receiving gas flow from the resonator,
   the aperture being generally coaxial with the resonator wall and having a transverse dimension substantially smaller than the transverse dimension of the resonator,
   the restrictor means having a frusto-conical wall facing the resonator and forming an acute angle with the direction of gas flow therefrom and intersecting said cylindrical wall at an acute angle downstream of the aperture.

* * * * *